US006643045B2

(12) United States Patent
Fujita et al.

(10) Patent No.: US 6,643,045 B2

(45) Date of Patent: Nov. 4, 2003

(54) OPTICAL SCANNER

(75) Inventors: Hiroyuki Fujita, Tokyo (JP); Tarik Bourouina, Tokyo (JP); Gilbert Reyne, Tokyo (JP); Eric Lebrasseur, Tokyo (JP); Hideo Muro, Yokohama (JP)

(73) Assignees: Nissan Motor Co., Ltd., Yokohama (JP); University of Tokyo, Tokyo (JP)

( * ) Notice: Subject to any disclaimer, the term of this patent is extended or adjusted under 35 U.S.C. 154(b) by 101 days.

(21) Appl. No.: 09/973,183

(22) Filed: Oct. 10, 2001

(65) Prior Publication Data

US 2002/0044327 A1 Apr. 18, 2002

(30) Foreign Application Priority Data

Oct. 10, 2000 (JP) ....................................... 2000-309038

(51) Int. Cl.[7] ................................................ G02B 26/08

(52) U.S. Cl. ........................ 359/224; 359/199; 359/214

(58) Field of Search ................................ 359/197, 198, 359/199, 212, 213, 214, 223, 224; 347/241, 242, 243, 259, 260

(56) References Cited

U.S. PATENT DOCUMENTS 5,763,782 A * 6/1998 Moore et al. ............ 73/514.18
6,094,289 A * 7/2000 Moranski et al. ........... 359/223
6,108,118 A * 8/2000 Minamoto .................. 359/224
6,309,077 B1 * 10/2001 Saif et al. ................... 359/871

FOREIGN PATENT DOCUMENTS

JP 9-054264 2/1997

OTHER PUBLICATIONS

Ikeda, et al., "Two Dimensional Silicon Micromachined Optical Scanner Integrated with Photo Detector and Piezoresistor," *The 8th International Conference on Solid State Sensors and Actuators, and Eurosensors IX*, Jun. 25–29, 1995, pp. 293–296.

* cited by examiner

*Primary Examiner*—Mark A. Robinson
(74) *Attorney, Agent, or Firm*—Foley & Lardner

(57) ABSTRACT

A semiconductor scanner substrate includes a vibrating structure of a mirror supported by a beam projecting from a frame. Strain sensing piezoresistors are formed in a base region of the beam adjacent to the frame. Metal interconnections are formed in the frame to connect the piezoresistors in a bridge circuit for sensing bending deformation or in a bridge circuit for sensing twisting deformation. Two of the piezoresistors extend alongside the lateral edges of the beam in the longitudinal direction of the beam, and these resistors are connected as adjacent arms in the bridge circuit for sensing the twisting deformation accurately.

17 Claims, 10 Drawing Sheets

9
B
B
4
1
8
10 3 5 2

GND
2
3
55d
C2
52d 50d
54d
56d
37"
56a
54a
39
62
50a 52a
38
61
C1
10"
55a
36"
Vcc

FIG.11A
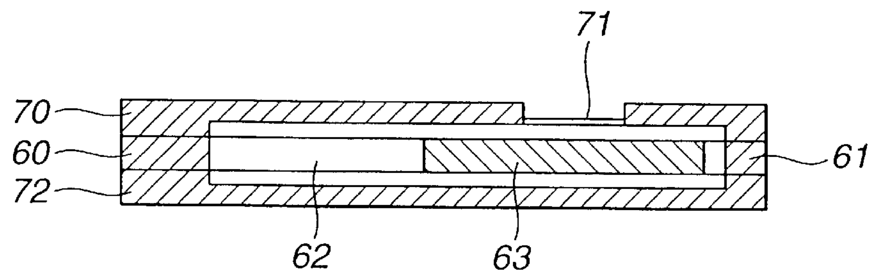
FIG.11B
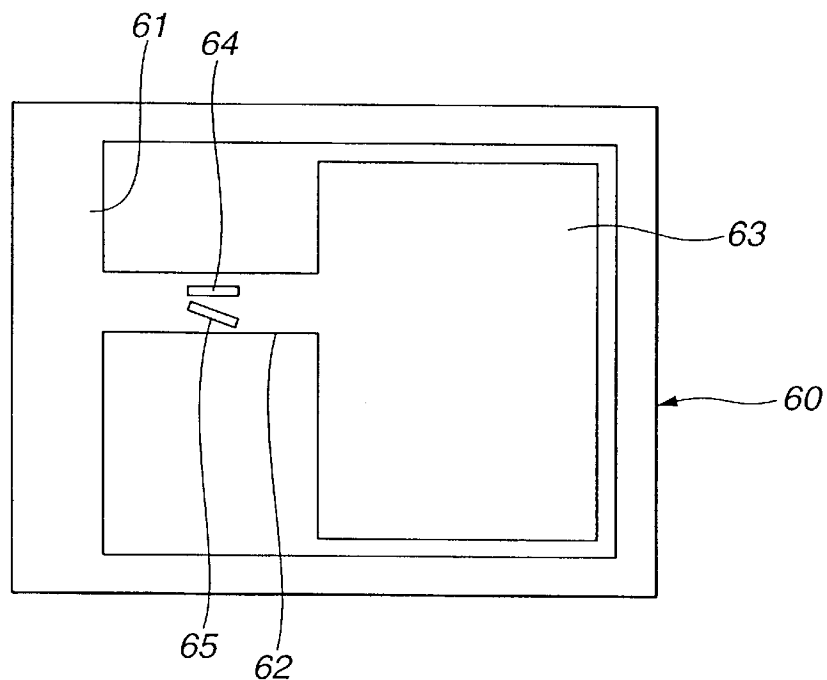
FIG.11C
SENSOR — CONTROLLER — ACTUATOR

OPTICAL SCANNER

BACKGROUND OF THE INVENTION

The present invention relates to optical scanners, and more specifically to micromachined semiconductor optical scanner.

An optical scanner having a rotatable mirror to direct reflected light to a desired direction is widely used in bar code reader, laser beam printer, display, and laser radar for a vehicle. In addition to a conventional optical scanner having a motor for driving a mirror, there has been proposed recently a micromachined semiconductor or crystal optical scanner that is superior in miniaturization and speed.

A published Japanese Patent Application, Publication (Kokai) No. 9-54264 discloses such a micromachined semiconductor optical scanning apparatus.

SUMMARY OF THE INVENTION

It is an object of the present invention to provide a small-sized reliable optical scanning apparatus simple in construction yet accurate in measurement.

According to the present invention, an optical scanning apparatus comprises: a mirror reflecting a light beam; a frame; a beam extending from the frame to the mirror and supporting the mirror to form a vibrating structure vibrating in bending mode and twisting mode to scan the light beam reflected from the mirror two-dimensionally; an actuator to excite the vibrating structure of the mirror and the beam in the bending mode and twisting mode; and a strain sensing section comprising a sensing element group arranged to sense bending deformation of the beam and to sense twisting deformation of the beam. The sensing element group comprises first and second longitudinal elements which extend longitudinally of the beam from the frame toward the mirror, and which are arranged to sense the twisting deformation of the beam with a difference between outputs of the first and second longitudinal elements.

According to the present invention, a fabricating process for fabricating a scanner substrate, comprising: forming a sensing section in a first major surface of a semiconductor substrate; forming a mirror film above the first major surface of the semiconductor substrate; and etching the semiconductor substrate selectively to form a mirror comprising the mirror film, a frame and a beam extending from the frame to the mirror and supporting the mirror.

The other objects and features of this invention will become understood from the following description with reference to the accompanying drawings.

BRIEF DESCRIPTION OF THE DRAWINGS

FIG. 1A is a plan view showing lateral layout. FIG. 1B is a cross sectional view showing a sectional structure.

FIGS. 11A, 11B and 11C are sectional view and plan view showing a scanner substrate of earlier technology, and a diagram showing a control system.

DETAILED DESCRIPTION OF THE INVENTION

Figure 1A:
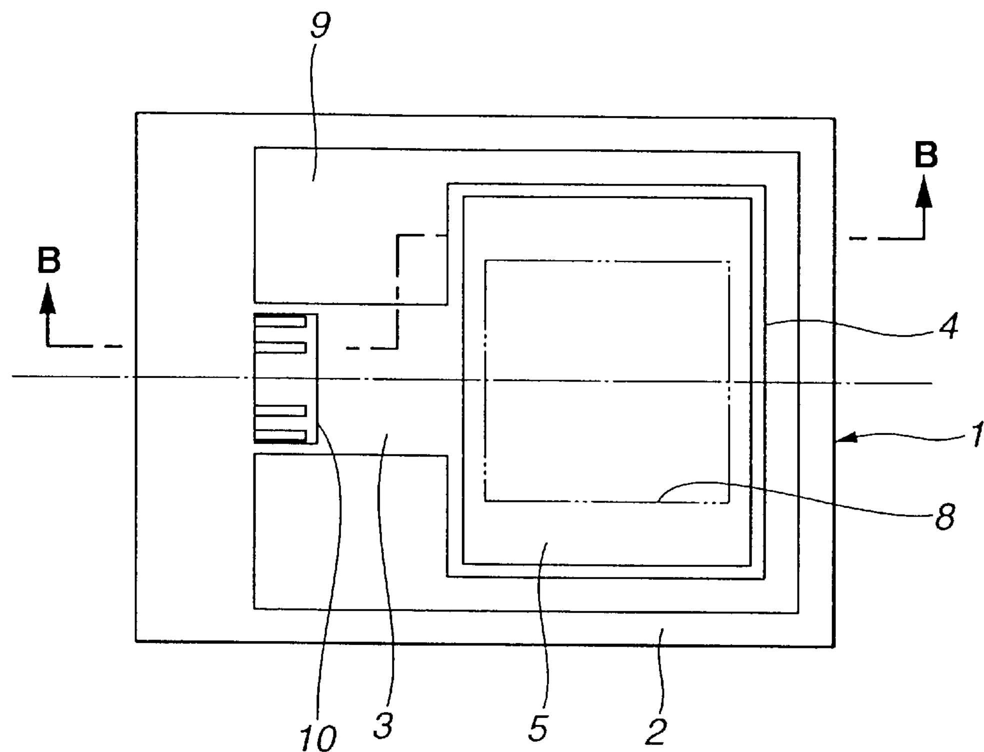
FIGS. 1A and 1B show an optical scanning apparatus according to a first embodiment of the present invention.

FIGS. 11A, 11B and 11C show a scanner of earlier technology as a comparative example. The scanner has a substrate 60 including a frame 61, a beam 62 and a mirror 63, an upper protective cover 70 formed with a transparent window 71, and a lower protective cover 72. Beam 62 supports mirror 63 at an offset position in the form of a cantilever. A first piezoresistor 64 extends in a longitudinal direction of beam 62. A second piezoresistor 65 extends obliquely at an inclination angle of 45° with respect to the longitudinal direction.

These resistors are p type diffusion regions formed in an n-type silicon substrate layer. An actuator is arranged to excite the vibration system of beam 62 and mirror 63 having two resonance points in bending mode and twisting mode. Longitudinal piezoresistor 64 is used to sense the resonance frequency of bending vibration with resistance changes. Oblique piezoresistor 65 is to sense the resonance frequency of twisting vibration with resistance changes. A sensor section including these piezoresistors, a controller section and an actuator section for vibrating beam 62 and mirror 63, as shown in FIG. 11C, form a control system such as a feedback control system.

In this micro scanner, the strain sensing elements 64 and 65 are formed at the middle of the beam, so that interconnection lines are extended deep into the beam. Therefore, the residual stress due to metal interconnection becomes non-negligible, and the accuracy in sensing the displacement at resonance tends to be decreased by a decrease of sensitivity and variation of offset. Moreover, because of the difference in coefficient of thermal expansion between the metal interconnection and the silicon beam, temperature changes can cause offset by bimetal effect and change in resonance frequency, so that the long term reliability of the apparatus becomes lower. Oblique piezoresistor 65 is not adequate for forming a full bridge circuit in the narrow width of the beam and for utilizing means for accuracy improvement.

The present invention will be described with reference to embodiments.

Figure 1B:
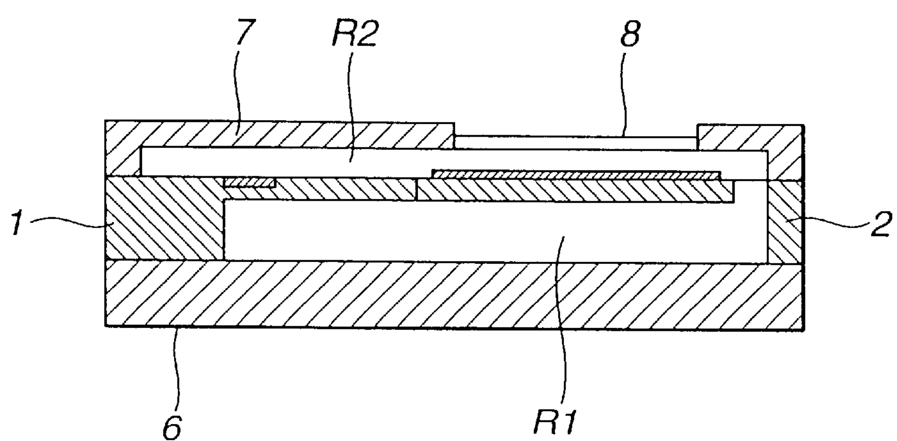

FIGS. 1A and 1B show an optical scanner (or scanning apparatus) according to a first embodiment.

FIG. 1A is a top plan view showing a scanner substrate.

FIG. 1B is a sectional view taken along line B—B shown in FIG. 1A, showing the optical scanner in an assembled state.

As shown in the sectional view of FIG. 1B, the optical scanner has a sandwich structure of a scanner substrate 1 sandwiched between a piezoelectric actuator 6 joined on the bottom face of scanner substrate 1 and a protecting plate 7 joined to the upper face of scanner substrate 1.

Scanner substrate 1 includes at least a frame (or frame portion) 2, an elastic support (or elastic support portion or beam) 3 and a mirror (or mirror portion) 4 encased in frame 2. Elastic support 3 extends from frame 2 to mirror 4, and supports mirror 4 in the form of a cantilever. Elastic support 3 and mirror 4 are made thinner than frame 2, and extended along the upper face of the frame 2 so that the upper surfaces of frame 2, elastic support 3 and mirror 4 are substantially flush with one another. Therefore, there is formed a space R1 between the piezoelectric actuator 6 and the structure of elastic support 3 and mirror 4. The lower (back) surfaces of elastic support 3 and mirror 4 are recessed (toward the upper surface) below the lower (back) surface of frame 2.

Protecting plate 7 is shaped like a dish, and placed on frame 2 so as to form a space R2 over elastic support 3 and mirror 4. Thus, the cantilever vibrating structure of mirror 4 and elastic support 3 extends in the inside space of the scanner so as to divide the inside space into the space R1 on the lower side and the space R2 on the upper side. Spaces R1 and R2 are designed to allow the mirror 4 and elastic support 3 to vibrate in the inside space.

In protecting plate 7, there is formed an optically transparent aperture (or window) 8 at a position corresponding to the position of mirror 4 of scanner substrate 1.

Scanner substrate 1 of this example is made of an n-type silicon, and mirror 4 is surrounded by a gap 9 which is enclosed by frame 2, as shown in the plan view of FIG. 1A. Mirror 4 is connected to the middle of one side of the rectangular frame 2 through elastic support 3. Elastic support 3 is smaller in width than mirror 4. Elastic support 3 projects from the middle of one side of the frame 2 into the inside space like a cantilever, and supports mirror 4 hanging free in the inside space of frame 2. In this example, a longitudinal center line of elastic support 3 passes through the center of mirror 4, and the vibrating structure of elastic support 3 and mirror 4 is bilateral-symmetrical with respect to a median plane containing the longitudinal center line.

The longitudinal center line shown by one dot chain line in FIG. 1A extends in a longitudinal or lengthwise direction of the beam or elastic support 3. The width of the beam or elastic support 3 as measured in a widthwise direction perpendicular to the longitudinal direction of the beam 3 is smaller than the width of the mirror 4, as shown in FIG. 1A.

On the upper surface of mirror 4, there is formed a reflecting film 5 for reflecting incident light from the transparent window 8. Reflecting film 5 of this example is a metallic thin film of gold or aluminum.

Piezoelectric actuator 6 is designed to excite the vibration system composed of elastic support 3 and mirror 4 in a bending vibration mode and a twisting (or torsional) vibration mode. Piezoelectric actuator 6 forces elastic support 3 to bend by the resonance when piezoelectric actuator 6 is driven at the resonance frequency in the bending vibration of the elastic support or beam 3. When driven at the resonance frequency in the twisting vibration of elastic support 3, piezoelectric actuator 6 forces the elastic support 3 to twist by the resonance. Therefore, mirror 4 reflects incident light through window 8, and scans the reflected light through window 8 by inclining the mirror surface. This scanning apparatus can perform two dimensional scanning by the combination of bending vibration and twisting vibration.

In order to calculate the displacement of mirror 4, there is formed in the connecting portion between elastic support 3 and frame 2, a strain sensing or detecting section 10 for sensing the strain or distortion of elastic support 3. Strain sensing section 10 of this example includes one or more piezoresistors formed in the upper surface of elastic support 3 in a base region adjacent to frame 2.

Figure 2:
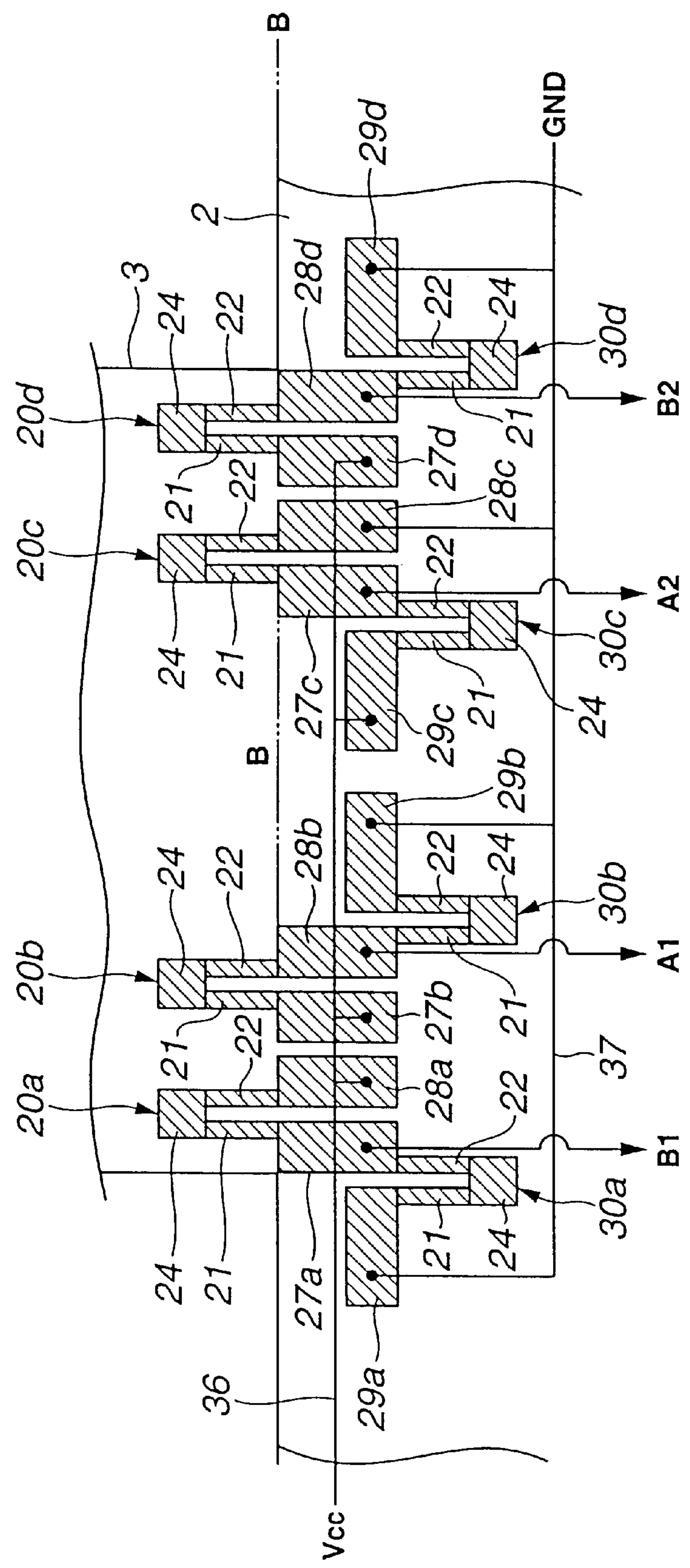
FIG. 2 is an enlarged plan view showing a strain sensing section of the optical scanning apparatus shown in FIGS. 1A and 1B.

FIG. 2 shows the connecting portion between elastic support 3 and frame 2 more in detail.

In the example shown in FIG. 2, four piezoresistors (sensing elements) 20 (20*a*, 20*b*, 20*c* and 20*d*) are arranged in the widthwise direction of elastic support 3. Of these four, the first and second piezoresistors 20*a* and 20*b* are placed in a first lateral (left side) region close to one side (the left side as viewed in FIG. 2) of elastic support 3, and the third and fourth piezoresistors 20*c* and 20*d* are placed in a second lateral region close to the other side (right side) of elastic support 3.

Each piezoresistor 20 of this example includes first and second parallel slender half segments 21 and 22 and a connecting lead 24. Each of the first and second half segments 21 and 22 extends from a base end to a forward end, longitudinally of elastic support 3, from the boundary between frame 2 and elastic support 3, toward mirror 4. The connecting lead 24 connects the forward ends of first and second segments 21 and 22. The base ends of the resistor half segments 21 and 22 are connected, respectively, with rectangular base leads 27 and 28 (27*a*, 28*a*: 27*b*, 28*b*: 27*c*, 28*c*: and 27*d*, 28*d*) formed on the frame 2. A line B shown in FIG. 2 represents an extension of the inner edge of the frame 2. Each of the first and second segments 21 and 22 is in contact with the corresponding base lead 27 or 28 along the line B. The base end of each resistor half segment 21 or 22 is located on the line B. The first and second segments 21 and 22 are formed on the upper surface of elastic support 3 whereas base leads 27 and 28 are formed on the upper surface of frame 2.

Base leads 27 and 28 extend in the longitudinal direction of elastic support 3 so that the longitudinal direction of each base lead is parallel to the longitudinal direction of elastic support 3. Each piezoresistor 20 corresponds to a longitudinal sensing element extending longitudinally of the beam or elastic support 3.

Hereinafter, suffixes (a, b, c and d) are added to reference numerals to discriminate individual piezoresistors. Suffixes are omitted when the whole or every member is meant.

On frame 2, there are further formed reference resistors (reference elements) 30 (30*a*, 30*b*, 30*c* and 30*d*) each of which is paired with a unique one of the four sensing piezoresistors 20*a*, 20*b*, 20*c* and 20*d*. Like the sensing piezoresistors 20, each reference resistor 30 includes first and second parallel slender half segments 21 and 22 and a connecting lead 24. On frame 2, each of first and second half segments 21 and 22 extends from a base end to a forward end, longitudinally of elastic support 3, in a direction away from mirror 4. Connection lead 24 connects the forward ends of first and second segments 21 and 22. In each reference resistor 30, the base end of one of the half segments 21 and 22 is connected with the base lead 27 or 28 of the mating sensing piezoresistor 20, and the base end of the other of the half segments 21 and 22 is connected with a reference lead 29 (29*a*, 29*b*, 29*c* or 29*d*) having a rectangular shape substantially congruent to the rectangle of the base leads 27 or 28. The longitudinal direction of each reference lead 29 is perpendicular to the longitudinal direction of each base lead 27 or 28, and hence parallel to the widthwise direction of elastic support 3.

Specifically, first and second half segments 21 and 22 of first reference resistor 30*a* are connected, respectively, with first reference lead 29*a* and base lead 27*a;* first and second half segments 21 and 22 of second reference resistor 30*b* are connected, respectively, with base lead 28*b* and reference lead 29*b;* first and second half segments 21 and 22 of reference resistor 30*c* are connected with reference lead 29*c* and base lead 27*c;* and first and second half segments 21 and 22 of reference resistor 30*d* are connected with base lead 28*d* and reference lead 29*d.*

Base leads 28*a,* 27*b* and 27*d* and reference lead 29*c* are connected with a voltage source Vcc through an aluminum interconnection (wiring line) 36 extending in frame 2.

Reference leads 29*a,* 29*b* and 29*d* and base lead 28*c* are connected with a ground terminal GND through an aluminum interconnection (wiring line) 37 extending in frame 2.

Through respective aluminum interconnections extending through frame 2, base lead 28*b* is connected with a terminal A1, base lead 27*c* is connected with a terminal A2; base lead 27*a* is connected with a terminal B1; and base lead 28*d* is connected with a terminal B2.

In this example, each of base leads 27 and 28, reference leads 29 and connecting leads 24 are in the form of a p-type diffusion layer like the piezoresistors 20 (or resistor half segments 21 and 22). However, each of these leads has a great width and a great area as compared to the resistor half segments 21 and 22, so that these leads function as interconnection of very low resistance.

Elements of strain sensing section 10 are connected in a bridge circuit 100 shown in FIG. 3A, and a bridge circuit 102 shown in FIG. 3B, as explained later.

FIGS. 4A, 4B, 4C and 4D show a process for fabricating the scanner substrate 1. In this example, a starting material is n-type silicon.

Figure 4A:
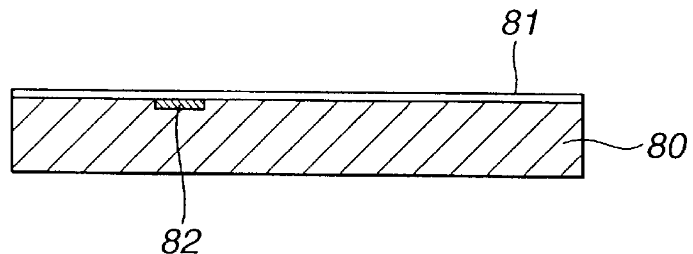
FIGS. 4A, 4B, 4C and 4D are sectional views showing a fabricating process for fabricating a scanner substrate of the optical scanning apparatus of FIGS. 1A and 1B.

First, as shown in FIG. 4A, a thermally oxidized film 81 is formed on an upper surface (or first major surface) of a planar (100) n-type silicon substrate 80. Thereafter, at least one p-type diffusion resistor 82 is formed in the <110> direction by implanting ions of boron through a mask.

Figure 4B:
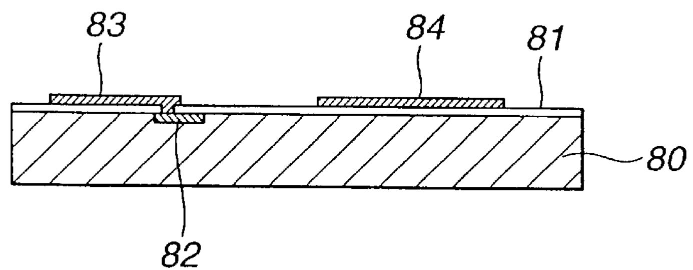

Next, as shown in FIG. 4B, the thermally oxidized film 81 is etched to form at least one window for contact with p-type diffusion resistor 82. Then, an aluminum film 83 is patterned by vapor deposition or sputtering to form aluminum wiring lines 36 and 37 and other interconnections. At the same time, an aluminum film 84 is formed in a portion corresponding to the mirror 4 to form the reflecting film 5.

Figure 4C:
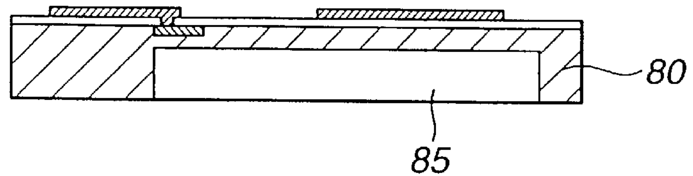

Thereafter, silicon substrate 80 is etched from the back side (from the lower surface as viewed in FIG. 4C), as shown in FIG. 4C, to form a recess 85. Recess 85 is depressed below the lower surface of the semiconductor substrate toward the upper surface, and the substrate thickness is reduced in recess 85. The recessed region of the reduced thickness defined by recess 85 is the region corresponding to elastic support 3 and mirror 4. Thus, the thickness of elastic support 3 and mirror 4 is reduced.

For the etching, an etch-resisting film is formed on the backside of the substrate and patterned to determine a region for selective etching. As the etching method, it is possible to employ wet etching method using a strong alkaline liquid such as KOH or dry etching method using gas of SF6.

Figure 4D:
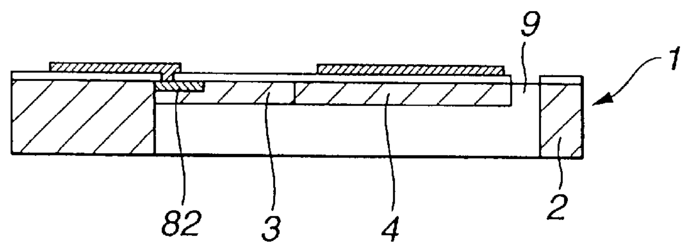

Then, an etch-resisting film is formed on the upper side of the substrate and patterned to form a gap (or cavity) (9) thereby to form elastic support 3 and mirror 4. Thereafter, the residual etch-resisting film is removed, and the scanner substrate is completed, as shown in FIG. 4D.

In this example, a plurality of p-type diffusion resistors 82 are formed to form the piezoresistors 20 and reference resistors 30.

Thus, the scanner substrate 1 can be fabricated by techniques used in ordinary LSI (large Scale Integration) process. Therefore, it is possible to form a multiplicity of scanner substrates 1 simultaneously in a wafer and to divide the wafer into a plurality of individual chips by dicing. Accordingly, the substrate 80 shown in FIG. 4A may be a wafer.

Figure 3A:
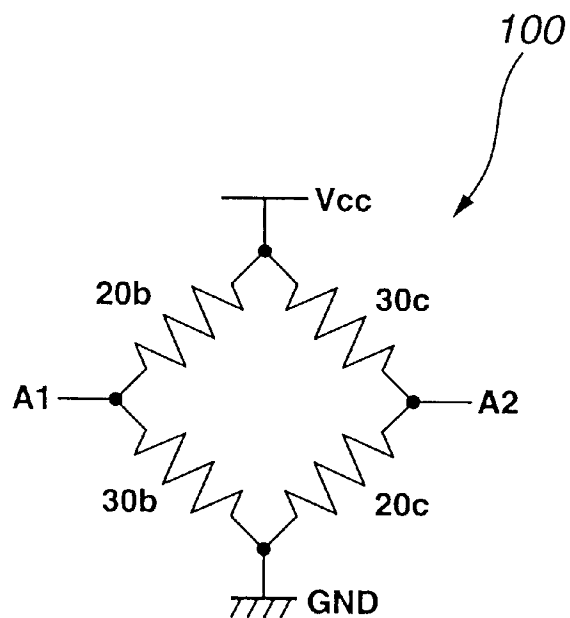
FIGS. 3A and 3B are circuit diagrams showing bridge circuits formed by sensing elements of the optical scanning apparatus of FIGS. 1A and 1B.

In the thus-constructed scanner substrate, the piezoresistors 20*b* and 20*c* are connected as opposed (or confronting) arms in bridge circuit 100 of FIG. 3A, so that components of resistances varying in phase are outputted, but components varying in opposite-phase are cancelled. Bridge circuit 100, therefore, can sense deformation in phase in the two lateral regions spaced in the widthwise direction of elastic support 3. That is, bridge circuit 100 can sense bending deformation of elastic support 3.

Figure 3B:
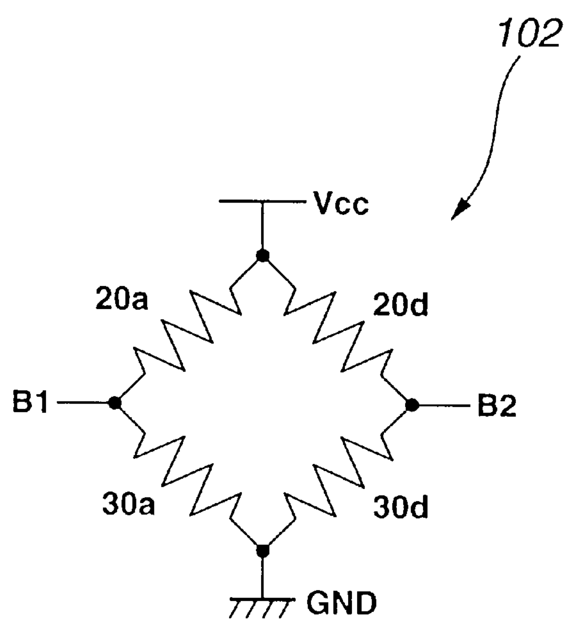

In bridge circuit 102 shown in FIG. 3B, on the other hand, piezoresistors 20*a* and 20*d* are connected as adjacent arms to output resistance components varying in opposite-phase but cancel components varying in phase. Bridge circuit 102, therefore, can sense deformation in opposite-phase in the two lateral regions. That is, bridge circuit 102 is designed to sense twisting deformation of elastic support 3.

In this embodiment, scanner substrate 1 is fixed on piezoelectric actuator 6, which is designed to excite the vibration system composed of elastic support 3 and mirror 4 to bending resonance and twisting resonance by being driven at predetermined frequencies. As a result, mirror 4 is moved and inclined, so that reflection film 5 deflects the reflected light.

The deflection angle is two times as large as the mechanical inclination angle of mirror 4, and the displacement of mirror 4 can be calculated by using the bridge circuits 100 and 102. Therefore, this scanning apparatus can specify the beam direction of the reflected light.

This embodiment is effective in reducing the size of the two-dimensional scanning optical scanner significantly by using the LSI technology. Moreover, the LSI fabricating process can reduce the manufacturing const effectively by mass production.

In strain sensing section 10, piezoresistors 20 extend from the inner edge extension line B of the frame 2 (or the boundary between frame 2 and elastic support 3) toward mirror 4 into elastic support 3 subjected to bending and twisting. Base leads 27 and 28 for interconnection are formed only on frame 2. Therefore, all the metallization layers for aluminum interconnections 36 and 37 are formed only on frame 2. This arrangement can prevent residual stress due to metallic layers on elastic support 3 and eliminate the possibility of the offset or the fluctuation, due to the bimetal effect caused by temperature changes.

In the first embodiment, four piezoresistors 20 are arranged in the widthwise direction of elastic support 3. The inside pair of piezoresistors 20*b* and 20*c* and the outside pair of piezoresistors 20*a* and 20*d* are connected with the reference resistors 30*a*~30*d* to form bridge circuits 100 and 102 as shown in FIGS. 3A and 3B. Therefore, the bridge circuits 100 and 102 can sense bending and twisting movements of elastic support 3 accurately and independently. The outside piezoresistors 20*a* and 20*d* formed, respectively, near the lateral edges of elastic support 3 are connected in bridge circuit 102 for sensing opposite-phase components so that the accuracy for sensing twisting is improved specifically.

In the example of FIGS. 4A~4D, the starting material is the n-type silicon substrate. However, it is optional to employ other materials, such as SOI and epitaxial substrate. In the case of an SOI substrate, for example, a buried oxide film may be formed at a level corresponding to elastic support 3 and mirror 4. The buried oxide film is used to stop the etching and thereby control the thickness of elastic support 3 and mirror 4 accurately and easily.

In the case of an epitaxial substrate having a p-type silicon substrate and an n-type epitaxial layer formed on the substrate, it is possible to form elastic support 3 and mirror 4 of an accurately controlled thickness by removing the p-type substrate selectively by electrochemical etching and leaving the n-type epitaxial layer unetched in the form of elastic support 3 and mirror 4.

Reflecting film 5 of mirror 4 may be a metallic film other than the aluminum film. For example, it is possible to form, as reflecting film 5, a film of gold or some other metallic film having a higher reflectivity by a step distinct from a step of forming an aluminum film for interconnection.

Figure 5:
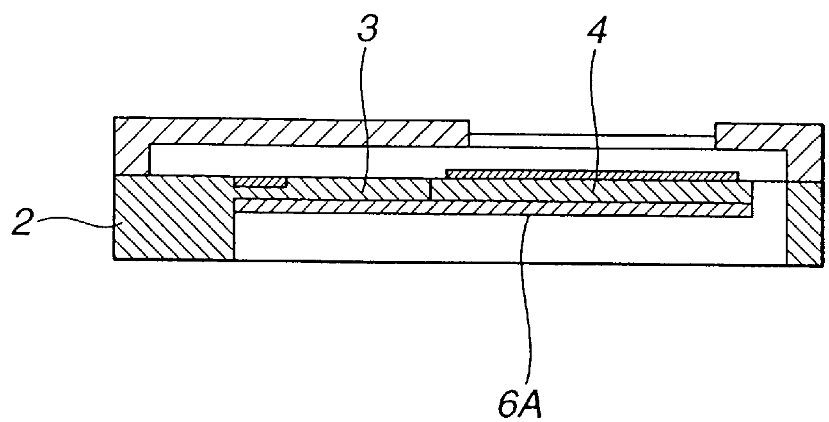
FIG. 5 is a sectional view showing a first modification of the first embodiment.

In the structure shown in FIG. 1B, piezoelectric actuator 6 is fixed to the bottom of scanner substrate 1 (or the lower side of frame 2) so that elastic support 3 and mirror 4 are vibrated through frame 2 of scanner substrate 1. However, in a modification shown in FIG. 5, a piezoelectric film 6A is formed on the back sides of elastic support 3 and mirror 4. When a voltage is applied through electrodes, the piezoelectric film 6A vibrates elastic support 3 in bending mode and twisting mode.

Instead of the piezoelectric film 6A, it is optional to form a magneto-strictive film. In this case, elastic support 3 is vibrated in bending mode and twisting mode by applying a magnetic field to the magneto-strictive film from the outside.

Where the functional thin film such as the piezoelectric film 6A or the magneto-strictive film is formed integrally with elastic support 3 and mirror 4 of scanner substrate 1, the step of mounting the scanner substrate 1 on the separate piezoelectric actuator can be eliminated, so that this design is advantageous for cost reduction and size reduction of the whole scanning apparatus.

Figure 6:
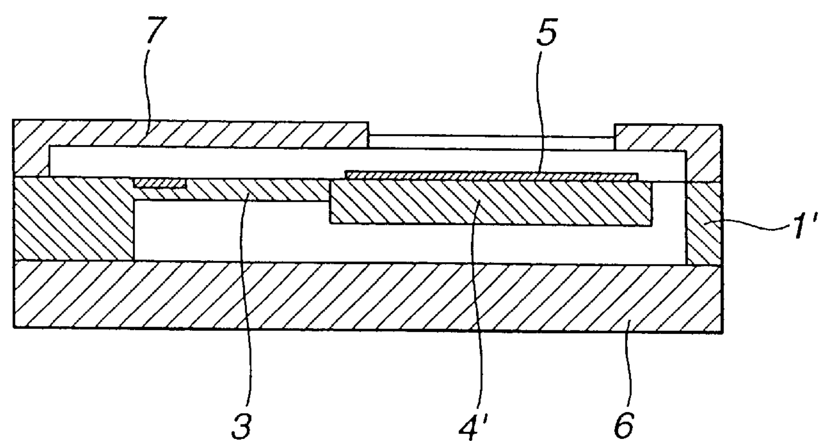
FIG. 6 is a sectional view showing a second modification of the first embodiment.

In the structure of FIG. 1A, elastic support 3 and mirror 4 are equal in thickness. However, in a modification shown in FIG. 6, a scanner substrate 1' has a mirror 4' which is thicker than elastic support 3. When piezoelectric actuator 6 is driven to cause resonance, the thicker mirror 4' can reliably maintain the flatness of reflecting surface (of reflecting film 5) without being bent or twisted, and thereby improve the accuracy in scanning by preventing distortion and deviation of the scanning beam.

Figure 7:
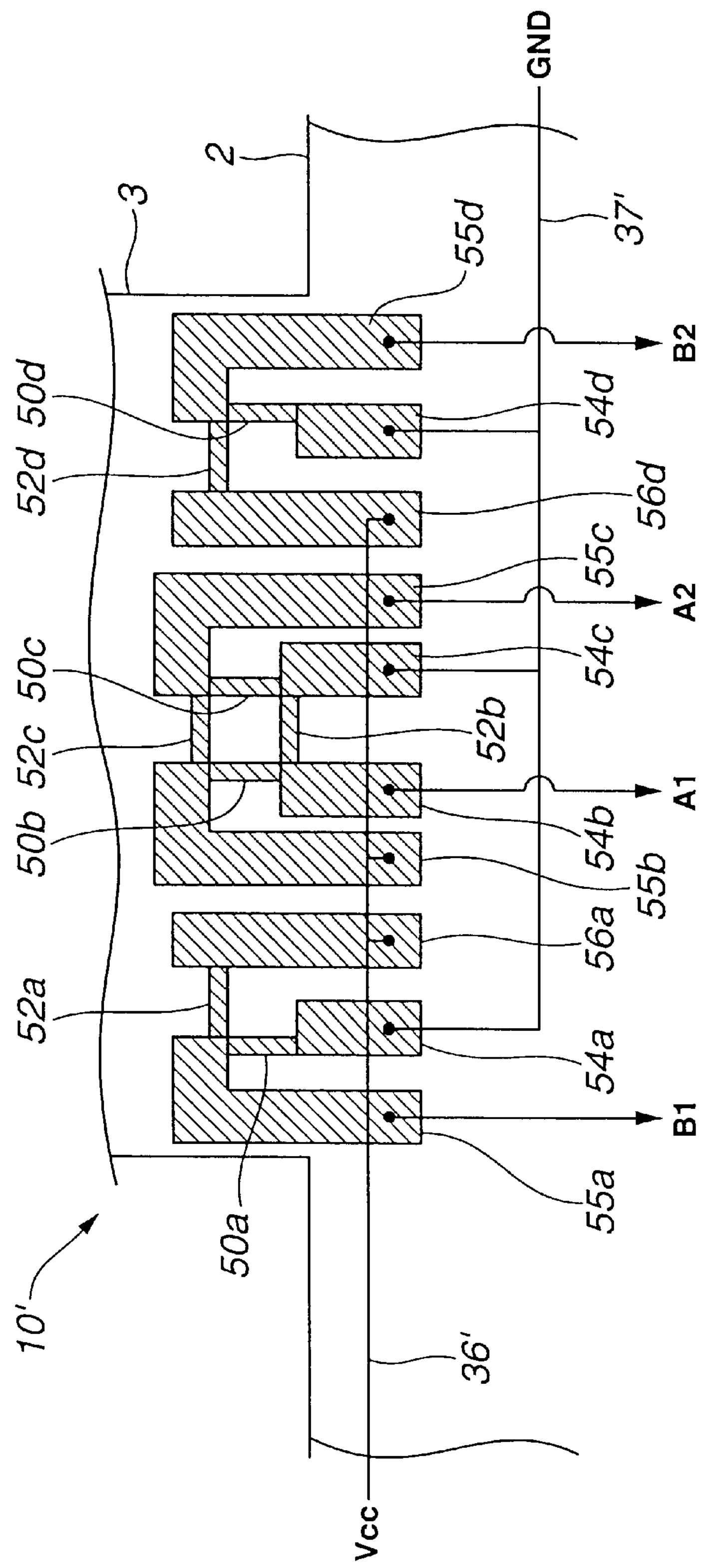
FIG. 7 is an enlarged plan view showing a strain sensing section of an optical scanning apparatus according to a second embodiment.

FIG. 7 shows a layout of piezoresistors in the strain sensing section according to a second embodiment.

In a strain sensing section 10' shown in FIG. 7, there are formed, on elastic support 3, longitudinal piezoresistors 50 (50*a*, 50*b*, 50*c* and 50*d*) extending in the longitudinal direction of elastic support 3, and widthwise piezoresistors 52 (52*a*, 52*b*, 52*c* and 52*d*) extending in the widthwise direction of elastic support 3.

In frame 2, there are formed rectangular short base leads 54 (54*a*, 54*b*, 54*c* and 54*d*) each extending in the longitudinal direction of elastic support from a first end to a second end located at or near the inner edge extension B of the frame 2. These base leads 54 are arranged in the widthwise direction of elastic beam 3, and their lengthwise direction is in parallel to the longitudinal direction of elastic support 3.

Longitudinal piezoresistors 50 extend on elastic support 3 in the longitudinal direction of elastic support 3, respectively, from the second ends of those short base leads 54. Each of the longitudinal piezoresistors 50 extends from a first end connected to the second end of the corresponding short base lead 54, to a second end connected to (an angled end of) a corresponding one of long base leads 55 (55*a*, 55*b*, 55*c* and 55*d*). Each of the long base leads 55 extends alongside a corresponding one of the short base leads 54 in the longitudinal direction of elastic support 3 into elastic support 3, so that each long base lead 55 has a first portion formed on frame 2 and a second portion formed on elastic support 3.

Each of the widthwise piezoresistors 52 extends, on elastic support 3, from a first lateral end (left end as viewed in FIG. 7) to a second lateral end (right end in FIG. 7) in the widthwise direction of elastic support 3.

The first lateral end of widthwise piezoresistor 52*a* is connected with the second end of the longitudinal piezoresistor 50*a*. Likewise, the second lateral end of piezoresistor 52*d* is connected to the second end of the longitudinal piezoresistor 50*d*. The other ends of the piezoresistors 52*a* and 52*d* are connected, respectively, with long base leads 56*a* and 56*d* extending alongside short base leads 54*a* and 54*d*, respectively. Each of long base leads 56 extends in the longitudinal direction of elastic support 3 from a first portion formed on frame 2 to a second portion formed on elastic support 3.

Widthwise piezoresistor 52*b* extends in the widthwise direction of elastic support 3 from a first lateral end connected with the connecting point between longitudinal piezoresistor 50*b* and base lead 54*b*, to a second lateral end connected with the connecting point between longitudinal piezoresistor 50*c* and base lead 54*c*. Widthwise piezoresistor 52*c* extends in the widthwise direction of elastic support 3 between the second ends of longitudinal piezoresistors 50*b* and 50*c*. Piezoresistors 50 correspond to the longitudinal strain sensing elements extending in the longitudinal direction of the beam (or elastic support) 3, and piezoresistors 52 correspond to the widthwise strain sensing elements extending in the beam's widthwise direction. In the example of FIG. 7, the resistors and leads are arranged substantially in a manner of bilateral-symmetry with respect to the longitudinal center line of elastic plate 3.

Each of base leads 54, 55 and 56 is in the form of a p-type diffusion layer like the piezoresistors 50 and 52. However, each of base leads 54, 55 and 56 is so broader than the piezoresistors 50 and 52 that each base lead functions as interconnection of very low resistance.

Base leads 56*a*, 55*b* and 56*d* are connected with the voltage source Vcc through an aluminum interconnection (wiring line) 36' extending only in frame 2.

Base leads 54*a*, 54*c* and 54*d* are also connected with the ground terminal GND through an aluminum interconnection (wiring line) 37' extending only in frame 2.

Through respective aluminum interconnection lines extending only in frame 2; base lead 54*b* is connected with a terminal A1; base lead 55*c* is connected with a terminal A2, base lead 55*a* is connected with a terminal B1; and base lead 55*d* is connected with a terminal B2.

The thus-constructed scanner substrate having the strain sensing section 10' according to the second embodiment can be fabricated substantially in the same fabricating process according to the first embodiment.

The piezoresistors formed in the <110> direction exhibit equivalent resistance changes of reversed polarities to the lengthwise stress and the widthwise stress so that the sensitivity can be improved as the full bridge circuit.

Figure 8A:
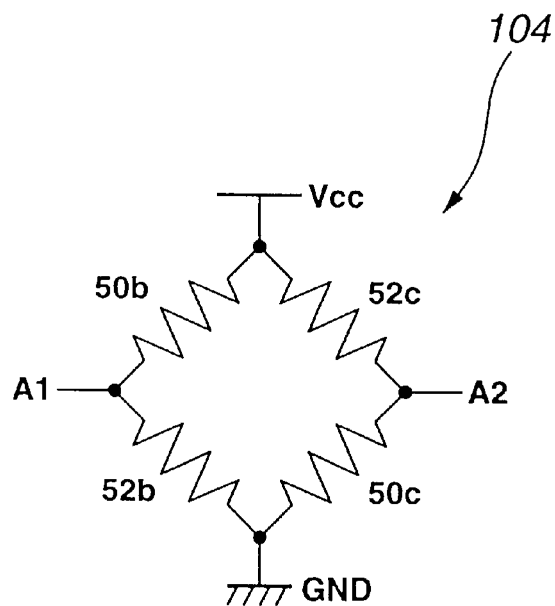
FIGS. 8A and 8B are circuit diagrams showing bridge circuits formed by sensing elements of the optical scanning apparatus of FIG. 7.
Figure 8B:
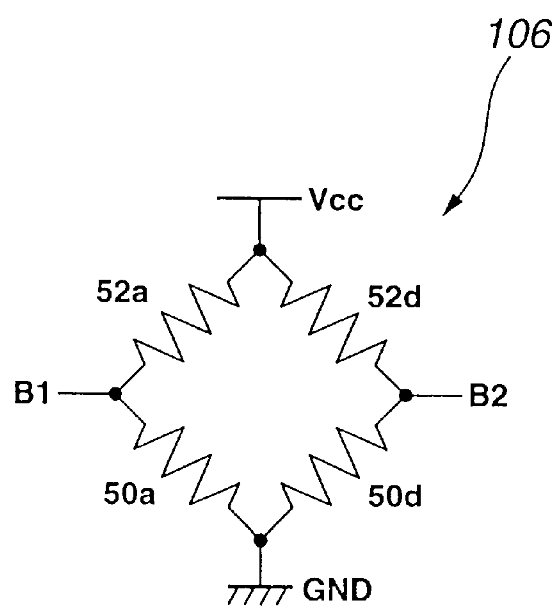

Longitudinal elements 50 and widthwise elements 52 are connected in a bridge circuit 104 as shown in FIG. 8A and in a bridge circuit 106 as shown in FIG. 8B.

Two parallel piezoresistors extending in parallel to each other in elastic support 3 in the longitudinal or widthwise direction are connected as opposed arms in bridge circuit 104 to sense the bending deformation with high sensitivity.

On the other hand, two parallel piezoresistors extending in parallel to each other in elastic support 3 in the longitudinal or widthwise direction are connected as adjacent arms in bridge circuit 106 to sense the twisting deformation with high sensitivity.

In the second embodiment, the aluminum interconnections 36' and 37' of metallization are all formed only on frame 2 without extending into elastic support 3, so that this structure is free from residual stress and the possibility of offset or fluctuation of the resonance frequency due to temperature changes as in the preceding embodiment.

Figure 9:
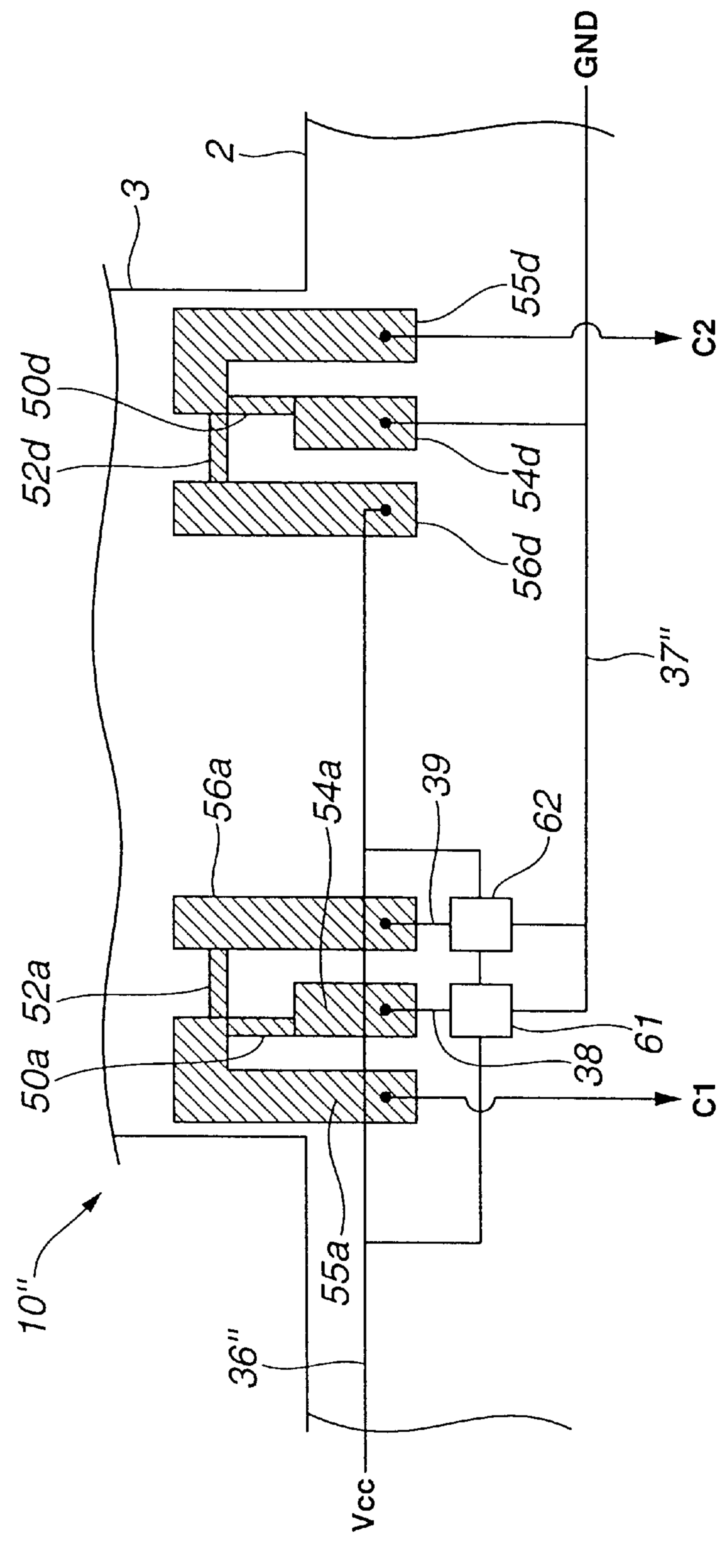
FIG. 9 is an enlarged plan view showing a strain sensing section of an optical scanning apparatus according to a third embodiment.

FIG. 9 shows a lateral layout of a strain sensing section 10" according to a third embodiment.

In this embodiment, as shown in FIG. 9, inside longitudinal piezoresistors 50*b* and 50*c* and inside widthwise piezoresistors 52*b* and 52*c* of FIG. 7 located near the longitudinal center line of elastic support 3 are eliminated. Strain sensing section 10" of FIG. 9 is composed of longitudinal piezoresistors 50*a* and 50*d* and widthwise piezoresistors 52*a* and 52*d* located on both sides of a center blank region extending on and along the longitudinal center line of elastic support 3. In the example shown in FIG. 9, resistors and leads are arranged substantially in a manner of bilateral symmetry as in the preceding embodiments.

Base lead 56*d* is connected with the voltage source Vcc through an aluminum interconnection 36" extending in frame 2, and base lead 54*d* is connected with the ground terminal GND through an aluminum interconnection 37" extending in frame 2.

Base lead 54*a* and base lead 56*a* are connected through aluminum interconnections 38 and 39, respectively, with switching devices 61 and 62 so that each of base leads 54*a* and 56*a* can be connected selectively through the aluminum interconnection line 36" to the voltage source Vcc or the aluminum wiring line 37" to the ground terminal GND. In this example, these switching devices 61 and 62 are formed as transistor switches in frame 2 of the scanner substrate by the LSI process.

By aluminum interconnections extending in frame 2, base lead 55*a* is connected to a terminal C1, and base lead 55*d* is connected to a terminal C2.

Figure 10:
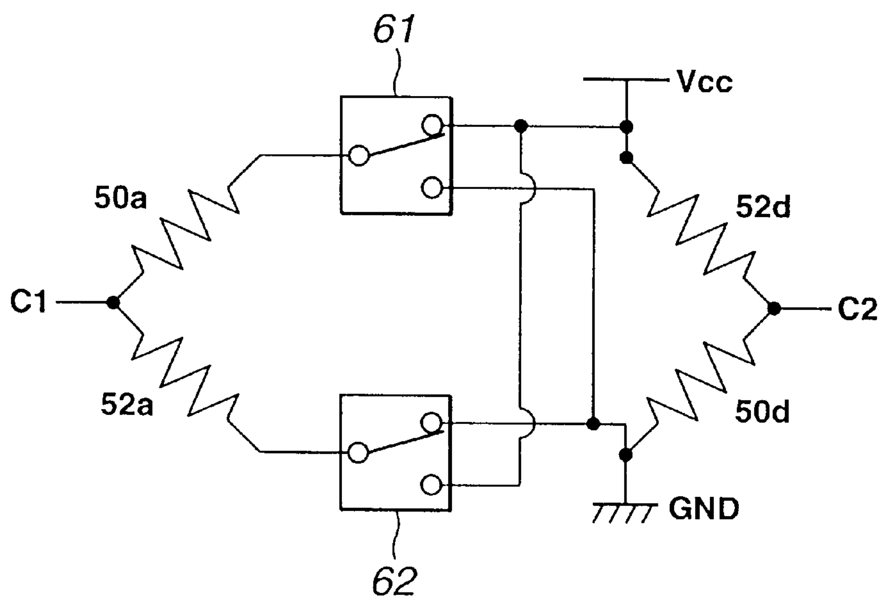
FIG. 10 is a diagram showing a bridge circuit formed by sensing elements in the optical scanning apparatus of FIG. 9.

Thus, sensing elements of strain sensing section 10" are connected in a bridge circuit shown in FIG. 10.

When switching device 61 is connected with voltage source Vcc whereas switching device 62 is connected with ground terminal GND, longitudinal piezoresistors 50*a* and 50*d* extending in parallel with each other on elastic support 3 are connected as opposed arms and widthwise piezoresistors 52*a* and 52*d* are connected as opposed arms confronting each other, so that strain sensing section 10" outputs an in-phase resistance component across terminals C1 and C2, and thereby enables detection of bending deformation with a high sensitivity.

When switching device 61 is connected with the ground terminal GND whereas switching device 62 is connected with the voltage source Vcc, the longitudinal piezoresistors 50*a* and 50*b* are connected as adjacent arms and widthwise piezoresistors 52*a* and 52*d* are connected also as adjacent arms to each other. Therefore, the bridge circuit in this state outputs opposite-phase resistance component across terminals C1 and C2, and thereby enables detection of twisting deformation with a high sensitivity.

In this way, the switching devices can connect sensing elements selectively in a bridge circuit adapted to sense bending deformation or a bridge circuit adapted to sense twisting deformation. Accordingly, a required space for the sensing circuit becomes smaller, so that the sensing elements can be readily formed in a narrow beam. The third embodiment is advantageous especially for the size reduction of the whole scanning apparatus.

In each of the illustrated embodiments according to the present invention, the longitudinal center line of elastic support 3 passes through the center of mirror 4. However, it is possible to employ an offset arrangement in which the longitudinal center line of elastic support does not bisect mirror 4 into equal halves, as in the design shown in FIG. 11B. Such an offset arrangement can increase the displacement in torsional vibration.

One or more of piezoelectric actuator 6, piezoelectric film 6A, magneto-strictive film and a mechanical device such as a motor can correspond to actuating means for scanning the light beam reflected from the mirror two-dimensionally by actuating the vibrating structure of the mirror and the beam in a bending mode and a twisting mode. One or more of piezoresistors 20*a,* 20*d,* 50*a,* 50*d,* 52*a* and 52*d* can correspond to twisting mode sensing means for sensing twisting deformation of the beam. One or more of piezoresistors 20*b,* 20*c,* 50*b,* 50*c,* 52*b* and 52*c* can correspond to bending mode sensing means for sensing bending deformation of the beam. The bending mode sensing means may comprise switching means for bringing at least part of the twisting mode sensing means (50*a,* 50*d,* 52*a,* 52*d*) to a state for sensing the bending mode vibration of the beam. Switching devices 61 and 62 correspond to the switching means.

This application is based on a prior Japanese Patent Application No. 2000-309038 filed Oct. 10, 2000 in Japan. The entire contents of this Japanese Patent Application No. 2000-309038 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An optical scanning apparatus comprising:

a mirror reflecting a light beam;

a frame;

a beam extending from the frame to the mirror and supporting the mirror to form a vibrating structure vibrating in bending mode and twisting mode to scan the light beam reflected from the mirror two-dimensionally;

an actuator to excite the vibrating structure of the mirror and the beam in the bending mode and twisting mode; and a strain sensing section comprising a sensing element group arranged to sense bending deformation of the beam and to sense twisting deformation of the beam, the sensing element group comprising, first and second longitudinal elements which extend longitudinally of the beam from the frame toward the mirror, and which are arranged to sense the twisting deformation of the beam with a difference between outputs of the first and second longitudinal elements.

2. The optical scanning apparatus as claimed in claim 1, wherein each of the first and second longitudinal elements comprises a base end located at a boundary between the frame and the beam, and a forward end located on the beam between the frame and the mirror; and the first and second longitudinal elements are spaced from each other in a widthwise direction of the beam across a center line of the beam.

3. The optical scanning apparatus as claimed in claim 1, wherein the optical scanning apparatus further comprises a first base lead formed on the frame and connected with the first longitudinal element, and a second base lead formed on the frame and connected with the second longitudinal element, and a metal interconnection formed on the frame and connected with the first and second base leads on the frame to connect the first and second elements in a circuit to detect the difference between the outputs of the first and second elements.

4. The optical scanning apparatus as claimed in claim 1, wherein the mirror is enclosed in the frame, and supported only by the beam in the form of a cantilever, wherein the mirror is wider than the beam, and wherein the mirror, frame and beam are integral parts of a semiconductor scanner substrate.

5. The optical scanning apparatus as claimed in claim 1, wherein the thickness of the mirror is greater than the thickness of the beam.

6. The optical scanning apparatus as claimed in claim 1, wherein the beam is formed by etching a semiconductor original substrate, and wherein the sensing element group is a group of piezo resistors diffused into the semiconductor substrate.

7. The optical scanning apparatus as claimed in claim 1, wherein the sensing element group further comprises a third longitudinal element arranged to sense the bending deformation of the beam.

8. The optical scanning apparatus as claimed in claim 7, wherein the sensing element group further comprises a fourth longitudinal element, the third and fourth longitudinal elements extend longitudinally of the beam between the first and second longitudinal elements, the first and second longitudinal elements are connected as adjacent arms in a first bridge circuit for sensing the twisting deformation of the beam, and the third and fourth longitudinal elements are connected as confronting arms in a second bridge circuit for sensing the bending deformation of the beam.

9. The optical scanning apparatus as claimed in claim 1, wherein each of the longitudinal elements comprises first and second segments extending from the frame to respective forward ends, and a connecting section connecting the forward ends of the first and second segments.

10. The optical scanning apparatus as claimed in claim 1, wherein the optical scanning apparatus further comprises first and second reference elements formed on the frame, and the first and second longitudinal elements and the first and second reference elements are connected in a bridge circuit to sense the difference between outputs of the first and second longitudinal elements.

11. The optical scanning apparatus according to claim 1, wherein the optical scanning apparatus further comprises first and second widthwise elements extending in a widthwise direction perpendicular to a longitudinal direction of the beam, and the first and second longitudinal elements and the first and second widthwise elements are connected in a bridge circuit.

12. The optical scanning apparatus according to claim 11, wherein the sensing element group further comprises third and fourth longitudinal elements, the optical scanning apparatus further comprises third and fourth widthwise elements extending in the widthwise direction of the beam, and the third and fourth longitudinal elements and the third and fourth widthwise elements are connected in a bridge circuit to sense the bending deformation of the beam.

13. The optical scanning apparatus according to claim 11, wherein the optical scanning apparatus further comprises a switching section comprising a first switch state to connect the first and second longitudinal elements and the first and second widthwise elements in a first bridge circuit to sense the twisting deformation of the beam, and a second switch state to connect the first and second longitudinal elements and the first and second widthwise element in a second bridge circuit to sense the bending deformation of the beam.

14. The optical scanning apparatus according to claim 13, wherein the first longitudinal element and the first widthwise element are connected in series; the second longitudinal element and the second widthwise element are connected in series; and the switching section comprises a first switching device arranged to connect a first end of a series combination of the first longitudinal element and the first widthwise element to one of first and second ends of a series combination of the second longitudinal element and the second widthwise element, and a second switching device arranged to connect a second end of the series combination of the first longitudinal element and the first widthwise element to one of the first and second ends of a series combination of the second longitudinal element and the second widthwise element.

15. An optical scanning apparatus comprising:

a semiconductor scanner substrate comprising a mirror reflecting a light beam, a frame enclosing the mirror, and a beam extending in a longitudinal direction from the frame to the mirror and supporting the mirror to form a vibrating structure;

an actuator to scan the light beam reflected from the mirror two-dimensionally by vibrating the vibrating structure of the mirror and the beam in a bending mode and a twisting mode; and a strain sensing section formed in the beam comprising a sensing element group arranged to sense bending deformation of the beam and to sense twisting deformation of the beam, the sensing element group comprising, first and second longitudinal elements which extend in the longitudinal direction of the beam from the frame toward the mirror, and which are connected in a circuit to sense the twisting deformation of the beam with a difference between outputs of the first and second longitudinal elements, and a third longitudinal element extending in the longitudinal direction of the beam from the frame toward the mirror, and being connected in a circuit to sense the bending deformation of the beam.

16. An optical scanning apparatus comprising:

a semiconductor scanner substrate comprising a mirror reflecting a light beam, a frame enclosing the mirror, and a beam extending in a longitudinal direction from the frame to the mirror and supporting the mirror to form a vibrating structure;

an actuator to scan the light beam reflected from the mirror two-dimensionally by vibrating the vibrating structure of the mirror and the beam in a bending mode and a twisting mode;

first and second longitudinal sensing elements which extend in the longitudinal direction of the beam from the frame toward the mirror and which are spaced apart from each other in a widthwise direction perpendicular to the longitudinal direction;

first and second widthwise sensing elements extending in the widthwise direction; and a switching section comprising a first switch state to connect the first and second longitudinal sensing elements and the first and second widthwise sensing element in a first bridge circuit in which the first and second longitudinal elements are adjacent to each other to sense twisting deformation of the beam, and a second switch state to connect the first and second longitudinal sensing elements and the first and second widthwise sensing element in a second bridge circuit in which the first and second longitudinal elements confront each other to sense bending deformation of the beam.

17. An optical scanning apparatus comprising:

a scanner substrate comprising a mirror reflecting a light beam, a frame enclosing the mirror, and a beam extending in a longitudinal direction from the frame to the mirror and supporting the mirror to form a vibrating structure;

actuating means for scanning the light beam reflected from the mirror two-dimensionally by vibrating the vibrating structure of the mirror and the beam in a bending mode and a twisting mode;

bending mode sensing means for sensing bending deformation of the beam; and twisting mode sensing means for sensing twisting deformation of the beam by providing a difference between outputs of first and second strain sensing elements extending in a longitudinal direction of the beam from the frame toward the mirror.

* * * * *